(No Model.)
O. F. PERSSON.
PNEUMATIC WHEEL TIRE.
No. 503,565.         Patented Aug. 15, 1893.
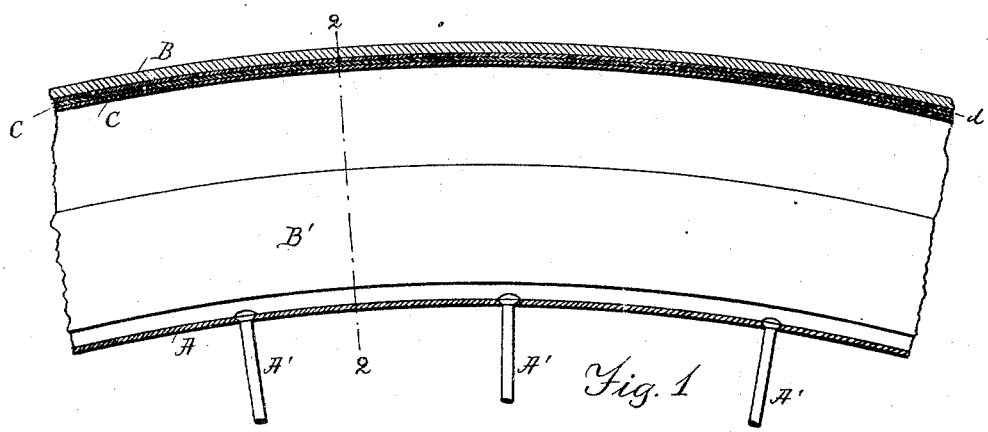
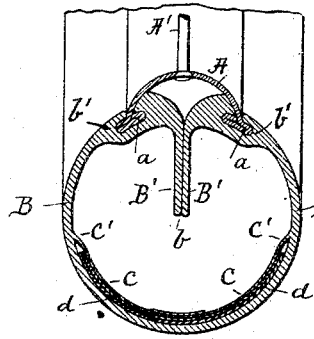
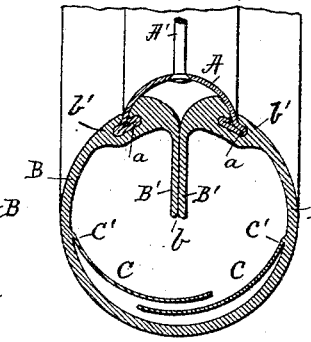
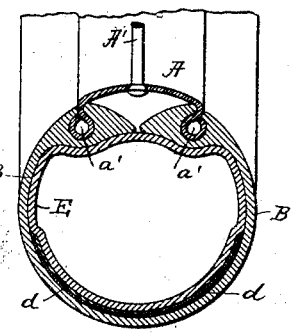
Fig. 2.        Fig. 3.        Fig. 4.
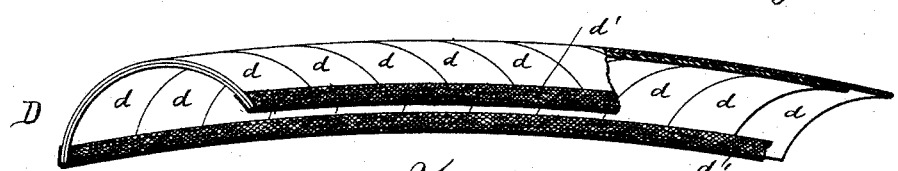
Fig. 5.
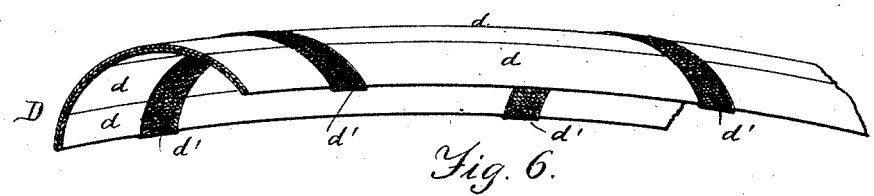
Fig. 6.
Witnesses.        Inventor.
Aurin F. Hill,        Otto F. Persson.
Etta Hendrickson        by Alban Andrén his atty.

UNITED STATES PATENT OFFICE.

OTTO F. PERSSON, OF SAUGUS, ASSIGNOR OF ONE-HALF TO HJALMAR C. SCHELIN, OF BOSTON, MASSACHUSETTS.

PNEUMATIC WHEEL-TIRE.

SPECIFICATION forming part of Letters Patent No. 503,565, dated August 15, 1893.

Application filed April 12, 1893. Serial No. 470,057. (No model.)

*To all whom it may concern:*

Be it known that I, OTTO F. PERSSON, a citizen of Sweden, and a resident of Saugus, in the county of Essex and State of Massachusetts, have invented new and useful Improvements in Pneumatic Wheel-Tires, of which the following, taken in connection with the accompanying drawings, is a specification.

This invention relates to improvements in pneumatic wheel tires and it is carried out as follows, reference being had to the accompanying drawings, wherein—

Figure 1 represents a longitudinal section of the improved tire, showing the internal armor in position. Fig. 2 represents a cross-section on the line 2—2 shown in Fig. 1. Fig. 3 represents a similar cross-section without the internal armor. Fig. 4 represents a cross-section showing a modification of the improved tire; and Figs. 5 and 6 represent perspective views of the improved armor adapted to be inserted within the improved tire.

Similar letters refer to similar parts wherever they occur on the different parts of the drawings.

A represents the concave metal rim of a velocipede or vehicle wheel, having T shaped edges $a, a$, to which the tire is attached as shown in Figs. 2 and 3, or if so desired said edges may be curved or roll shaped as shown at $a', a'$ in Fig. 4.

A', A', are the spokes secured to the rim A as usual.

B is the endless band tire preferably made of rubber or other suitable material which is open at $b$ and provided at this place with inwardly projecting lips B', B', which are adapted to be held hermetically closed against each other as shown in Figs. 2 and 3 when the pneumatic pressure is applied within the tire after the rim A has been secured to it, which is done by inserting the T shaped or equivalent edges $a, a$, in correspondingly shaped grooves $b', b'$, in the tire B as shown in Figs. 2 and 3.

Within the tire B are arranged a pair of annular flexible strips C, C, cemented or otherwise secured at C', C', to the interior of the tire B and having their free edges over-lapping each other as shown in Figs. 2 and 3, so as to form a hermetically sealed joint, between said over-lapping strips when expanded by the pneumatic pressure within the tire B thus preventing the collapse of the latter, in case it should be torn or punctured, said overlapping strips thus serving as a safety device in case of accidental injury to the main portion of the tire.

In practice I prefer to arrange between the interior of the tire B and the strips C, C, a suitable ring shaped armor D shown in detail in Figs. 5 and 6, which armor is composed of laterally or longitudinally arranged layers $d, d$, the outer layer of which is arranged to break joint with the inner one and vice versa so as to produce a flexible, strong and uniformly constructed armor for the protection of the tire in case of injury to it. Said armor is preferably made of horn, leather, leatheroid or similar tough substance and the layers therein are held together by lateral or longitudinal thin elastic sheets $d', d'$, which are cemented or otherwise attached to said layers. In the drawings Figs. 5 and 6, I have shown said flexible sheet in the form of edge or cross bands attached to the armor, but if so desired the said flexible sheet may cover the entire armor, on the inside, the outside or both in-and out-sides as circumstances may require. In the modification represented in Fig. 4, I have shown the said armor as arranged between the main tire B and an internal pneumatically expansive tube E as a substitute for the over-lapping strips C, C, and the inwardly projecting sealing lips B', B'.

What I wish to secure by Letters Patent and claim is—

1. A wheel tire consisting of an endless band B open at $b$ and having the inwardly projecting closing lips B', B', combined with T shaped or equivalent longitudinal grooves $a, a$, adapted to fit and receive correspondingly shaped annular edges on the rim of the wheel, substantially as and for the purpose set forth.

2. A wheel tire consisting of an endless band B open at $b$ and having inwardly projecting closing lips B', B', adapted to form a tubular section with said band B combined with a pair of annular strips C, C, secured to the interior of the band B and having their free ends over-lapping each other, substantially as and for the purpose set forth.

3. A wheel tire consisting of an endless band B having inwardly folding lips B', B', as described, combined with T shaped or equivalent longitudinal grooves $a$, $a$, adapted to fit and receive correspondingly shaped annular edges on the rim of the wheel and a pair of annular strips C, C, secured within the band B, and having their free ends over-lapping each other, substantially as and for the purpose set forth.

4. The combination with an expansive or inflatable wheel tire, of an internal ring armor, consisting of two superposed layers each composed of narrow strips with abutting edges and the strips of one layer breaking joints with the strips of the other layer, and an elastic sheet or band which holds the two layers in proper relation to each other, substantially as and for the purposes described.

5. A wheel tire consisting of an endless open band B, having inwardly projecting closing lips B', B', and having external longitudinal grooves adapted to receive the correspondingly shaped edges of the wheel rim combined with a pair of annular strips C, C, secured to the interior of the band C and having their free ends over-lapping each other, as described and an intermediate ring armor consisting of a series of over-lapping layers and a partial or continuous elastic envelope surrounding said armor, substantially as and for the purpose set forth.

In testimony whereof I have signed my name to this specification, in the presence of two subscribing witnesses, on this 25th day of March, A. D. 1893.

OTTO F. PERSSON.

Witnesses:
ALBAN ANDRÉN,
ROBERT F. ANDERSSON.